US008225025B2

(12) United States Patent
Chang et al.

(10) Patent No.: US 8,225,025 B2
(45) Date of Patent: Jul. 17, 2012

(54) MOTHERBOARD WITH SELECTED SUB-SYSTEM CONTROLLING SHARED PERIPHERALS

(75) Inventors: Chia Yi Chang, Taipei Hsien (TW); Chih Wei Wu, Taipei Hsien (TW)

(73) Assignee: DFI Inc., Taipei Hsien (TW)

( * ) Notice: Subject to any disclaimer, the term of this patent is extended or adjusted under 35 U.S.C. 154(b) by 402 days.

(21) Appl. No.: 12/611,410

(22) Filed: Nov. 3, 2009

(65) Prior Publication Data
US 2011/0035520 A1 Feb. 10, 2011

(30) Foreign Application Priority Data
Aug. 5, 2009 (TW) .................. 98126312 A

(51) Int. Cl.
*G06F 13/00* (2006.01)

(52) U.S. Cl. .................. 710/316; 710/301; 710/313

(58) Field of Classification Search .................. 710/100, 710/316, 301, 305, 313
See application file for complete search history.

(56) References Cited

U.S. PATENT DOCUMENTS
7,565,562 B2 * 7/2009 Chary ............................ 713/324
2008/0052708 A1 * 2/2008 Zhong ............................... 718/1
* cited by examiner

*Primary Examiner* — Glenn A Auve
(74) *Attorney, Agent, or Firm* — Muncy, Geissler, Olds & Lowe, PLLC

(57) ABSTRACT

A motherboard for selecting one of sub-systems immediately includes a plurality of sub-systems, a shared/control unit, and an input/output unit. The plurality of sub-systems individually has a corresponding kernel unit, a corresponding interface control unit and a corresponding power circuit. According to an external selecting signal, the shared/control unit selects a corresponding sub-system to be the target sub-system, so that the target sub-system can control all the shared peripherals.

21 Claims, 11 Drawing Sheets

MOTHERBOARD WITH SELECTED SUB-SYSTEM CONTROLLING SHARED PERIPHERALS

BACKGROUND OF THE INVENTION

1. Field of the Invention

The present invention relates to a computer motherboard disposed with a plurality of sub-systems which may be immediately selected by users.

2. Description of the Prior Art

The recent trend in the development of computer technology is characterized by diversity. The public's demand on computers is more than simple and ordinary and thus a variety of computers are designed to cater to the distinct needs of different groups of population. In particular, computers with ultra low power, ultra-slim volume are greatly appreciated by users. Moreover, although many CPUs are characterized by their ultra low power consumption, some chipsets associated with these CPUs do not fare well in power consumption. Consequently, between different computers systems, there exist differences in functions, cost, power consumption, volume, integration, and compatibility.

For the application of computers, another important demand is data parallel processing. Some users might need certain specific function as well as fast processing speed at the same time. To meet the demands, the so-called computer peripherals sharing switch has emerged as a result. A computer peripherals sharing switch allows two or more computers to share keyboard, screen, and mouse. Consequently, users can operate two or more computers at the same time. However, a computer peripherals sharing switch has many drawbacks:

1. Since a computer peripherals sharing switch needs to connect to two or more computers, it needs a large amount of physical wires. Physical wires not only occupy space but also experience oxidation, loose contacts, and other common problems seen on conventional wires; thereby, physical wires are not convenient in practice.

2. Although a computer peripherals sharing switch can enable two or more computers to share some peripherals, a computer peripherals sharing switch cannot fully integrate two or more computers, thereby creating an incomplete integration of a hybrid system. For example, when the first computer is downloading a film from internet and the peripherals sharing switch is switched to the second computer, the user cannot monitor the progress of downloading the film in the first computer from the second computer.

3. Although a computer peripherals sharing switch can enable two or more computers to share some peripherals, the switch occupies a large amount of space and is therefore unfavorable to home users.

4. Although a computer peripherals sharing switch can enable two or more computers to share some peripherals, a plurality of computers are turned on at the same time and thus consume excess power. A computer peripherals sharing switch is therefore unfavorable to home users.

5. Although a computer peripherals sharing switch can enable two or more computers to share some computer peripherals, a conventional peripherals sharing switch does not provide the feature of safe removal and thus cannot ensure the safe removal of peripherals; therefore, a conventional peripherals sharing switch is inconvenient for users and tends to render the system unstable.

Another conventional technique of parallel computing employs a plurality of systems and switches between different systems, as described in, for example, U.S. Pat. Nos. 6,578,140B1, 5,680,536, and 6,993,620. Nevertheless, these conventional techniques still have the same drawbacks with the computer peripherals sharing switch, including incomplete integration of software and hardware, incomplete division of peripheral interfaces, occupying too much space, consuming excess power, and so on.

SUMMARY OF THE INVENTION

The primary object of the present invention is to provide a motherboard for selecting one of sub-systems immediately. The above motherboard is disposed with a plurality of sub-systems and users may immediately select one of the sub-systems to be the target sub-system, such that the target sub-system can independently control all the shared peripherals.

To achieve the above and other objects, the present invention provides a motherboard for selecting one of sub-systems immediately. The above motherboard for selecting one of sub-systems immediately includes a plurality of sub-systems, a shared/control unit, and an input/output unit. The plurality of sub-systems individually has a corresponding kernel unit, a corresponding interface control unit, and a corresponding power circuit. The shared/control unit is electrically coupled to the above sub-systems and a signal trigger unit. The input/output unit is electrically coupled to the above shared/control unit and the above sub-systems. According to an external selecting signal, the shared/control unit selects a corresponding sub-system to be the target sub-system. Then, the shared/control unit inputs a corresponding signal of the target sub-system to the input/output unit. The target sub-system outputs at least a first specific signal to a corresponding peripheral, and the corresponding peripheral outputs at least a second specific signal to the target sub-system, such that the target sub-system can independently control all the shared peripherals.

According to the preferred embodiment of the present invention, the above kernel unit includes a memory and a central processing unit. The above central processing unit is electrically coupled to the memory, the interface control unit, and the power circuit.

According to the preferred embodiment of the present invention, the above interface control unit includes individually a corresponding independent interface and a corresponding shared interface. The independent interface is electrically coupled to the input/output unit. The shared interface is electrically coupled to the shared/control unit. In the present embodiment, the independent interface includes a USB interface and a SATA interface, and the shared interface includes a VIDEO (image) interface, an AUDIO (sound) interface, USB (universal serial bus) interfaces, and a SATA interface. In practice, the independent interface and the shared interface may include any kinds of interfaces.

According to the preferred embodiment of the present invention, the above sub-systems individually have an independent operating system. The sub-systems may operate individually or simultaneously and users can immediately select a sub-system from the sub-systems to be the target sub-system.

According to the preferred embodiment of the present invention, the corresponding power sources of the above sub-systems can be individually turned off and only the target sub-system is turned on for operation.

According to the preferred embodiment of the present invention, the above input/output unit is electrically coupled to a plurality of connectors, such that the independent interfaces and the shared interfaces individually have a corresponding connector.

According to the preferred embodiment of the present invention, the above motherboard further includes a share controller. The share controller is coupled to the shared/control unit, and the share controller is electrically coupled to an external signal trigger unit via a connector to generate an external selecting signal.

According to the preferred embodiment of the present invention, the above external signal trigger unit has a plurality of status lights to indicate the corresponding target sub-system.

According to the preferred embodiment of the present invention, the above sub-systems individually have a built-in display unit to output video signals. Further, the sub-systems individually have an external card slot to connect with an external card. The external card feedbacks a corresponding signal to the shared/control unit. Then, via input/output unit, the external card outputs the corresponding signal to a corresponding peripheral.

According to the preferred embodiment of the present invention, via physical wires, the connector of the external card is coupled to a corresponding connector of the motherboard, such that the external card feedbacks the corresponding signals to the shared/control unit.

In summary, the present invention provides a motherboard for selecting one of sub-systems immediately. In the present invention, a single motherboard is disposed with a plurality of sub-systems, such that users can select a sub-system from the sub-systems. The advantages of the present invention are described as follows:

1. The present invention does not require a large amount of physical wires to connect a plurality of sub-systems. Consequently, the system of the present invention does not occupy too much space, have loose contacts, and other common problems seen on conventional wires. Even home users can feel the convenience offered by the system according to the present invention. The present invention overcomes the drawbacks of prior art to provide home users with the convenience of buying a computer with a present motherboard to enjoy the functions and advantages of a multiple system.

2. The present invention can fully integrate the peripherals of two or more computers, such that a hybrid system can be fully integrated therebetween.

3. The present invention enables two or more computer sub-systems to share all the shared peripherals without occupying too much space and is therefore favorable to home users.

4. The present invention enables two or more computer sub-systems to share all the shared peripherals and the present invention divides power sources, such that each power source of the sub-systems can be turned off individually and thus electricity can be effectively conserved and is therefore favorable to home users.

5. With the present invention, users can freely decide the power consumption and performance level, thereby conserving unnecessary energy consumption.

6. The independent interface and shared interface designed according to the present invention can not only achieve the goal of data parallel processing, but also integratedly control peripherals by switching among a plurality of sub-systems. In particular, a single motherboard disposed with a plurality of sub-systems can accelerate data transmission, enhance signal quality, and improve the reliability of system operation via layout technique and IC design technique (SOC). Therefore, the present invention can not only accelerate data processing, but also facilitate users to effectively use the available bandwidth.

7. The present invention can enable two or more computers to share all of peripherals and also provide the function of safe removal of peripherals. The present invention can therefore ensure the safe removal of peripherals. Consequently, the present invention can not only enhance the convenience in use, but also enhance the system reliability.

To enable a further understanding of the objectives and the technological methods of the invention herein, the brief description of the drawings below is followed by the detailed description of the preferred embodiments.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1A:
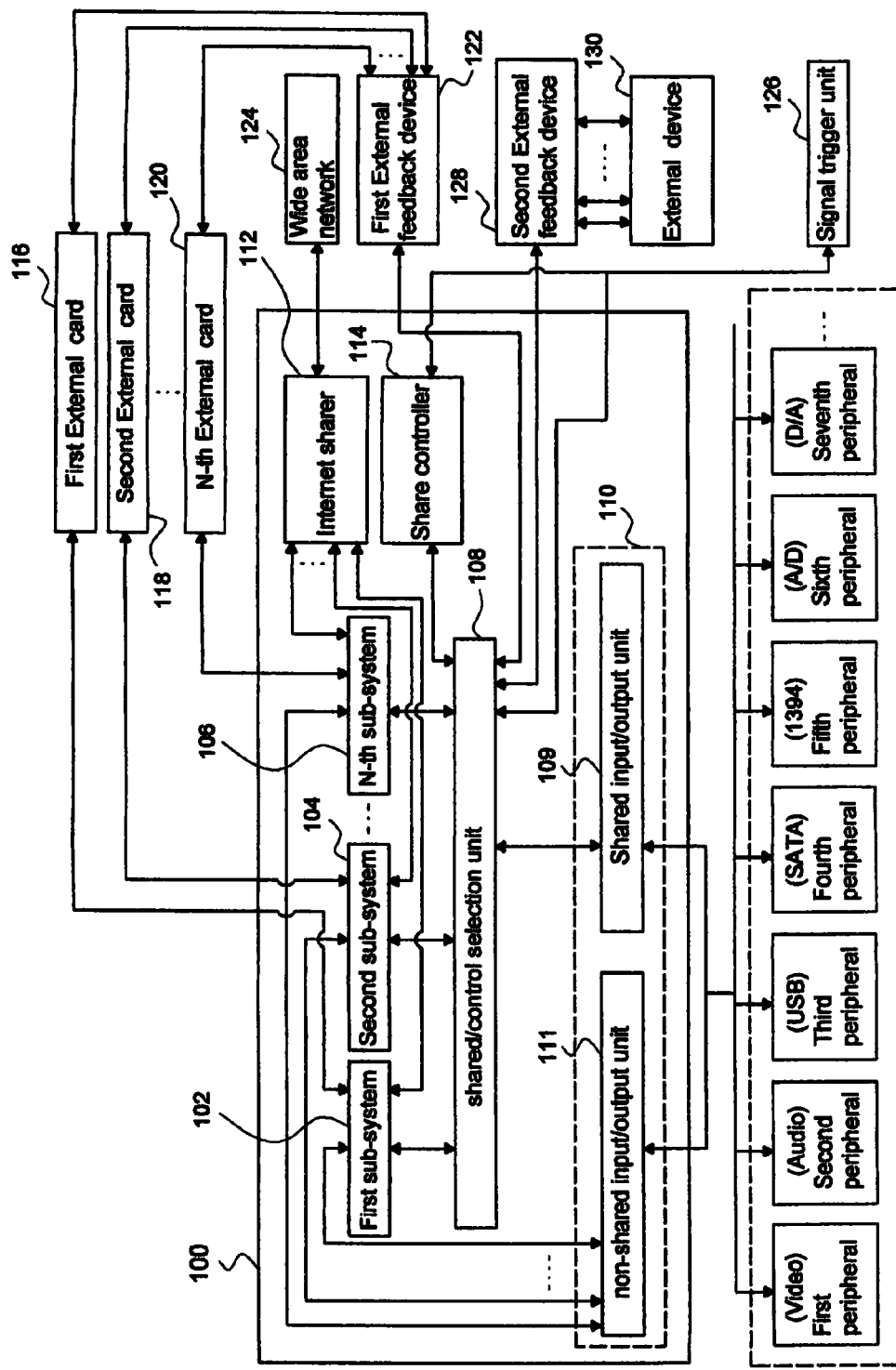
FIG. 1A is a schematic view showing a block diagram of a motherboard for selecting one of sub-systems immediately according to a preferred embodiment of the present invention.

Referring to FIG. 1A, a motherboard for selecting one of sub-systems immediately according to a preferred embodiment of the present invention is illustrated. A motherboard 100 for selecting one of sub-systems immediately includes N sub-systems (a first sub-system 102, a second sub-system 104, a $N^{th}$ sub-system 106), a shared/control unit 108, an input/output unit 110, an internet sharer 112, and a share controller 114, wherein the N sub-systems are electrically connected to the shared/control unit 108, the input/output unit 110, and the internet sharer 112 via buses. Further, the shared/control unit 108 is electrically coupled to the share controller 114 and a signal trigger unit 126. Also, the motherboard 100 for selecting one of sub-systems immediately has at least a slot, such that each sub-system has a corresponding slot, and the above slots can be inserted therein with a first external card 116, a second external card 118, and a $N^{th}$ external card 120. The first external card 116, the second external card 118, and the $N^{th}$ external card 120 have connectors for signal output and can feedback signals from the external cards to the shared/control unit 108 via a first external feedback device 122 (signal wire, for example). Via at least a second external feedback device 128 (connector, signal wire for example), an external device 130 (notebook computer for example) can feedback a corresponding signal to the shared/control unit 108 so as to output the corresponding signal to a corresponding peripheral or the motherboard 100. Further, the internet sharer 112 connects to a wide area network 124. The input/output unit 110 is coupled to a plurality of peripherals. The signal trigger unit 126 generates an external selecting signal. According to the external selecting signal, the shared/control unit 108 selects a corresponding sub-system to be the target sub-system, such that the target sub-system can obtain the control all the shared peripherals; i.e., the target sub-system can control all the shared peripherals. Further, the external device 130 can participate in sharing peripherals. Via the external selecting signal, the external device 130 can also become a target system, such that external device 130 can independently control all the shared peripherals of the motherboard 100 for selecting one of sub-systems immediately.

Figure 1B:
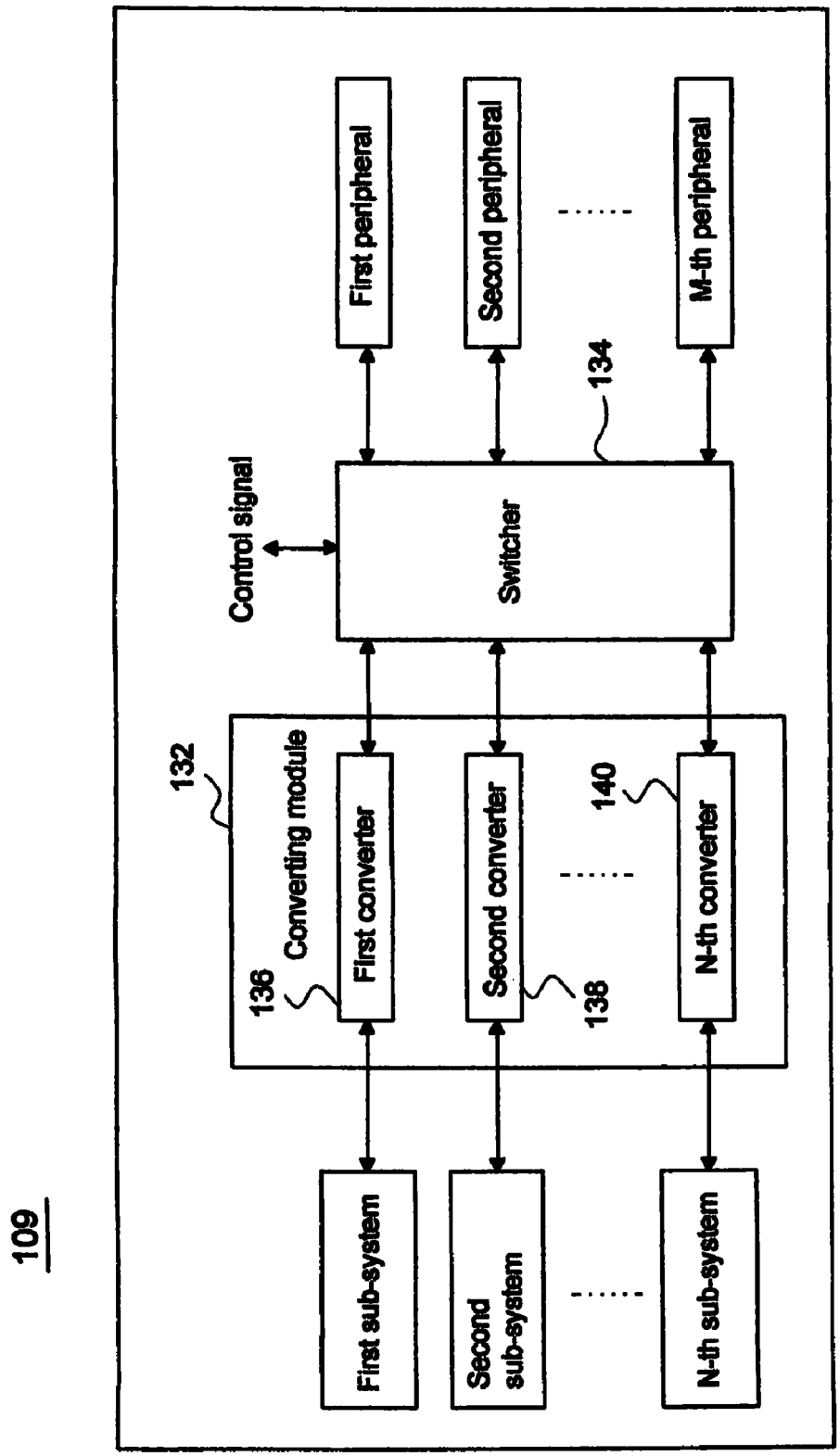
FIG. 1B is a schematic view showing a block diagram of an input/output unit according to a preferred embodiment of the present invention.

Referring to FIG. 1B, the block diagram of an input/output unit according to a preferred embodiment of the present invention is illustrated. Referring also to FIG. 1A, the input/output unit 110 has a shared input/output unit 109 and a non-shared input/output unit 111. The shared input/output unit 109 and a non-shared input/output unit 111 individually have a corresponding physical connector. If all peripherals have to be shared by all sub-systems, then the peripherals are connected to the corresponding physical connectors of the shared input/output unit 109, and vice versa. For example, if an external hard drive is connected to the physical connector of the corresponding non-shared input/output unit 111 of the first sub-system 102 and another external hard drive is connected to the physical connector of the corresponding shared input/output unit 109 of the first sub-system 102, the first sub-system 102 can read film data from the shared external hard drive to the non-shared external hard drive.

Figure 1C:
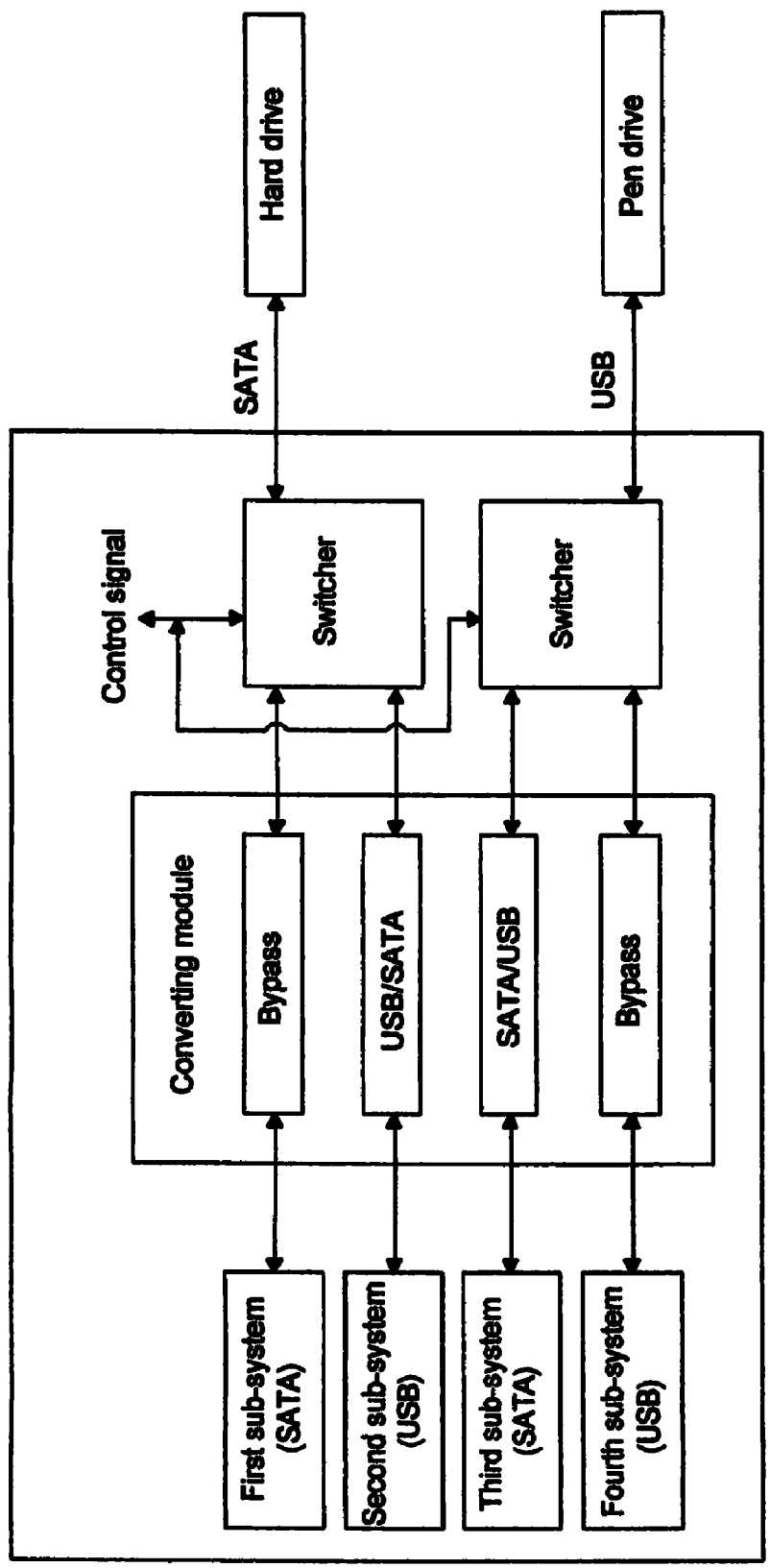
FIGS. 1C to 1E are schematic views showing an input/output unit transmits various signals to the peripherals.
Figure 1D:
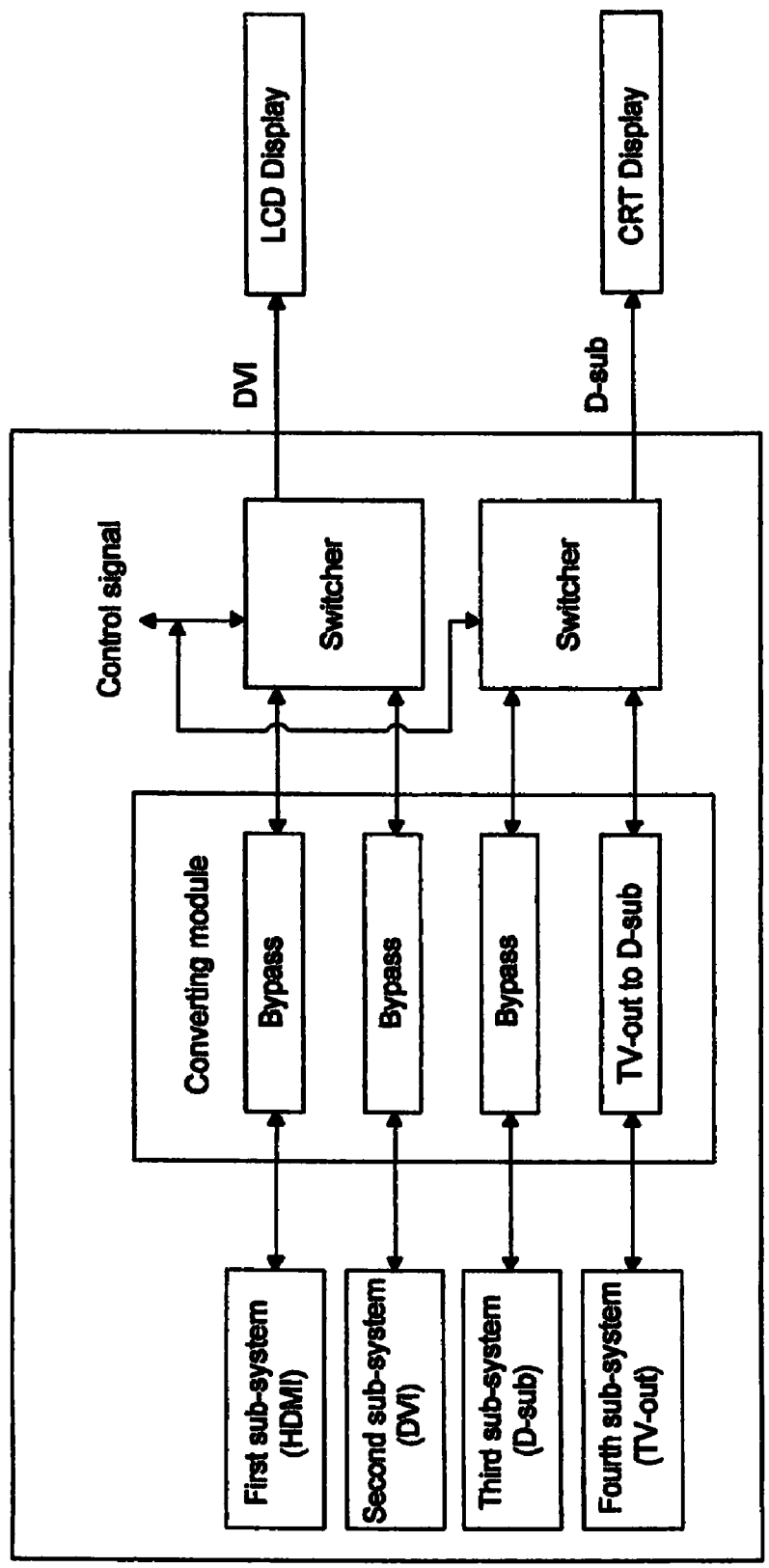
Figure 1E:
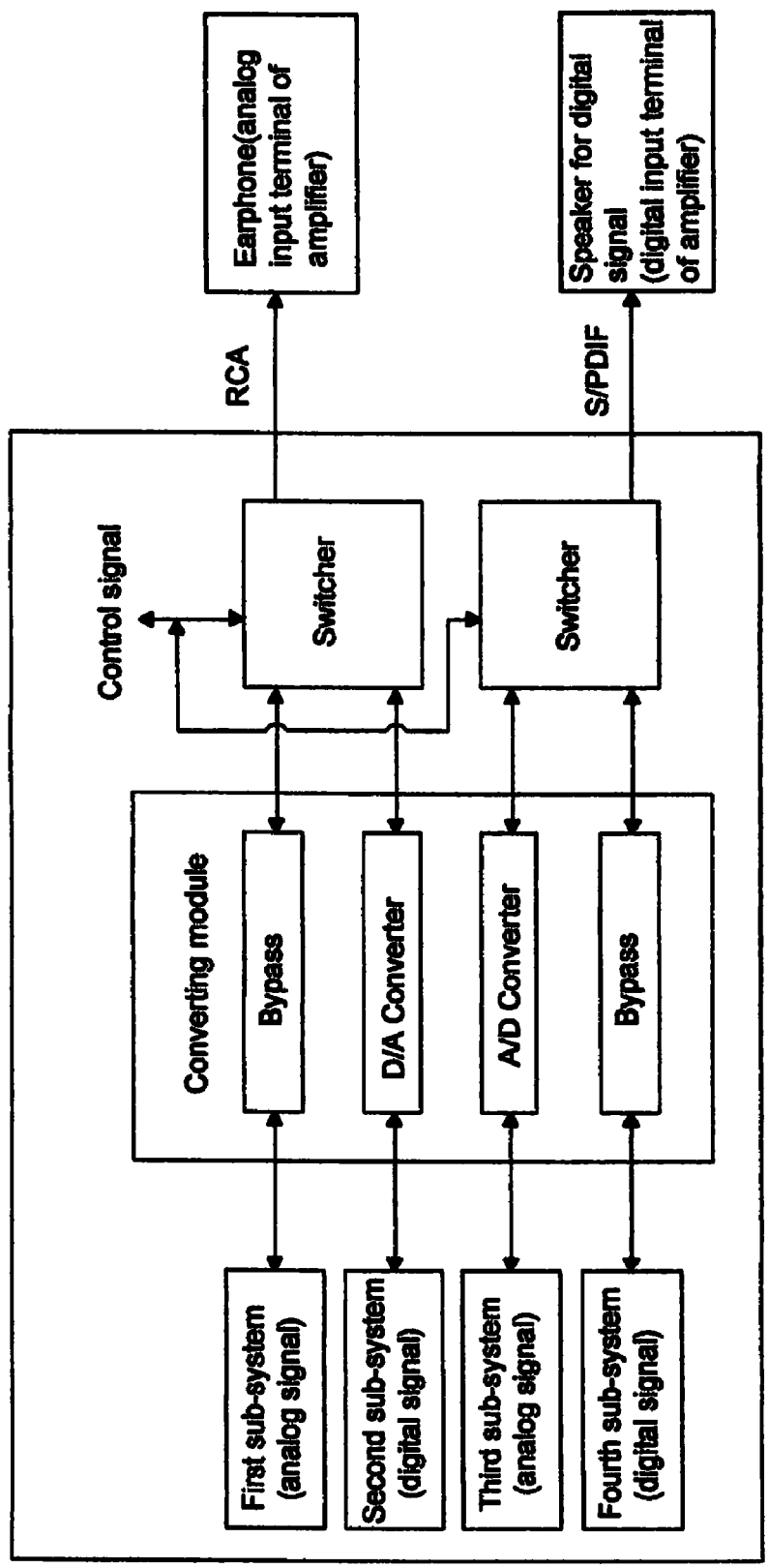

Further, the shared input/output unit 109 has the structure shown in FIG. 1B, and designers can design the converter shown in FIG. 1B as necessary. The shared input/output unit 109 includes a converting module 132 and a switcher 134. The converting module 132 includes a plurality of converters (a first converter 136, a second converter 138, and an $N^{th}$ converter 140). The converting module 132 is coupled to a corresponding sub-system and the switcher 134. The switcher 134 is coupled to a corresponding peripheral. The converting module 132 outputs original signals to the switcher 134 or after converting the original signals, the converting module 132 outputs corresponding signals to the switcher 134. For example, we can convert image signals; image signals can be converted between DVI signals and RGB signals to enhance the compatibility between the motherboard and all sub-systems. Since a motherboard includes a plurality of sub-systems, compatibility is a key technique. The control signals control the signal switching action of the switcher 134. Referring to FIGS. 1C to 1E, the input/output unit transmitting various signals to the peripherals is illustrated.

Figure 1F:
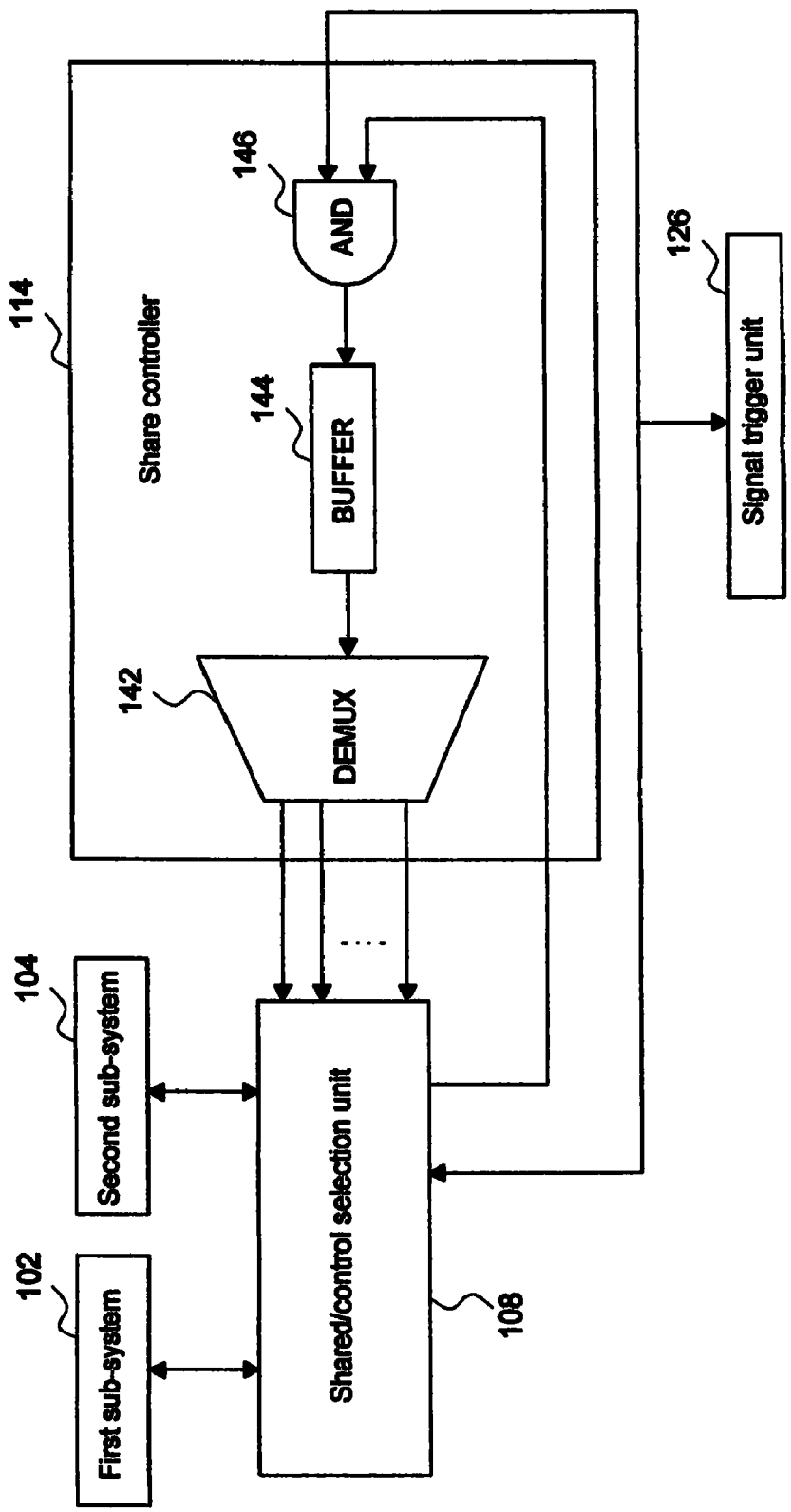
FIG. 1F is a schematic view showing how a shared/control unit safely switches sub-systems.

Referring to FIG. 1F, how the shared/control unit safely exchanges sub-systems is illustrated. The share controller 114 includes a demultiplexer 142, a buffer 144, and a gate 146. The output terminal of the demultiplexer 142 is coupled to the shared/control unit 108. The buffer 144 is coupled to the input terminal of the demultiplexer 142. The output terminal of an AND gate 146 is coupled to the buffer 144, the input terminal of the AND gate 146 is coupled to the signal trigger unit 126 and the shared/control unit 108. When the signal trigger unit 126 generates a first trigger signal, the operating system removes the corresponding sub-system immediately. Then, the operating system generates a second trigger signal, and the shared/control unit 108 inputs the second trigger signal to the input terminal of the AND gate 146. The target sub-system is switched according to the first trigger signal and the second trigger signal.

For example, if the present target sub-system is the first sub-system 102, users want to switch the target sub-system to the second sub-system 104. If users press a certain preset switching key, the signal trigger unit 126 changes the trigger level to generate a first trigger signal. The first trigger signal is transmitted to the south bridge chip of the first sub-system 102 via the shared/control unit 108. After the operating system receives the first trigger signal, the operating system enables a self-developed application software to safely remove the shared peripherals. Then, the software feedbacks a second trigger signal via the south bridge. The second trigger signal is transmitted to the AND gate 146 in the share controller 114 via the shared/control unit 108. The first trigger signal can then be transmitted to the shared/control unit 108 via the AND gate 146, the buffer 144, and the demultiplexer 142. The motherboard can then actually switch the second sub-system 104 to be the target sub-system. The circuit shown in FIG. 1F has the advantage of avoiding hardware malfunction or data loss when users switch between sub-systems without safely removing shared peripherals, thereby providing good protection performance. The present invention can therefore ensure the safe removal of shared peripherals. Consequently, the present invention can indeed enhance convenience in use and also increase the system reliability.

Figure 2A:
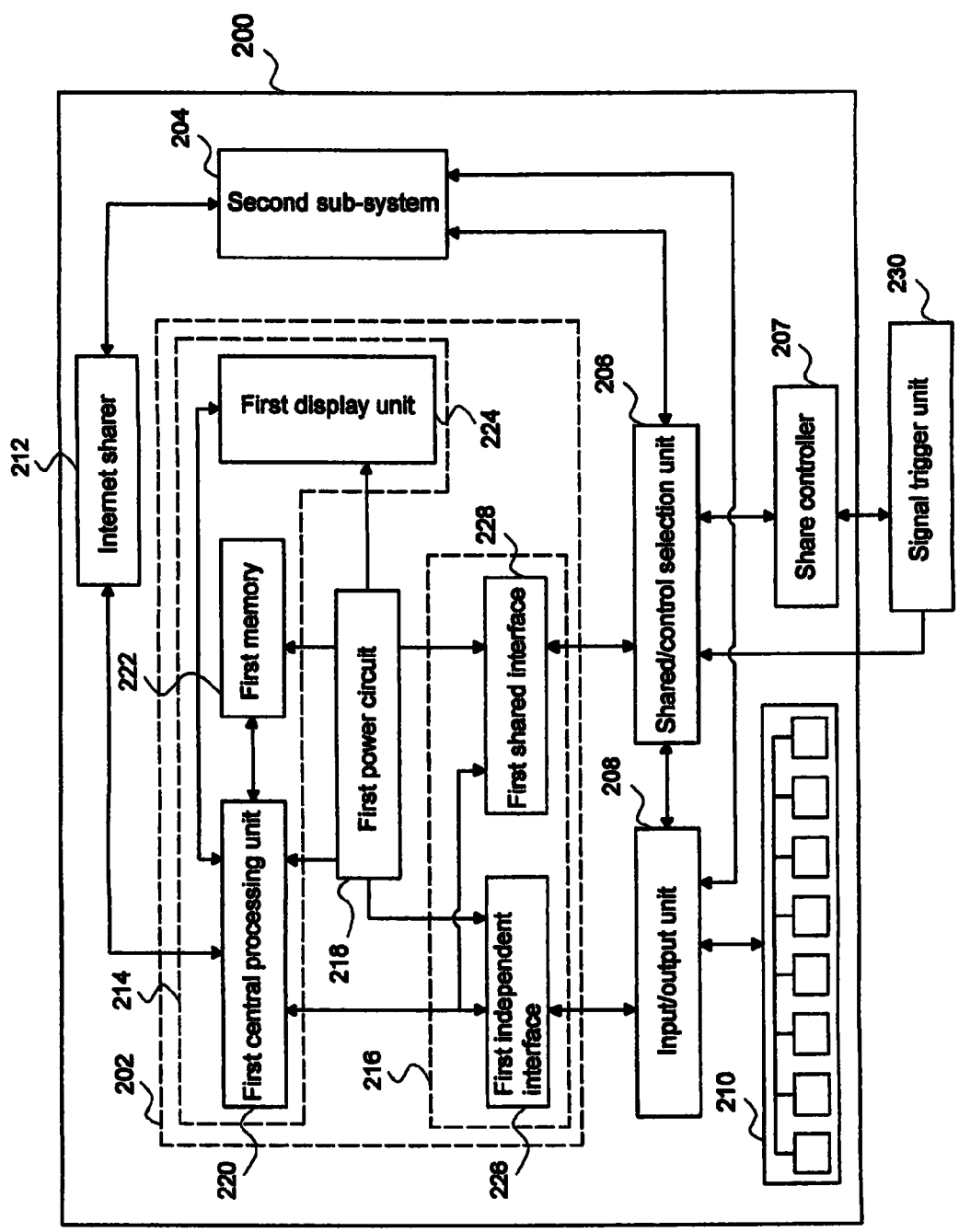
FIG. 2A is a schematic view showing a block diagram of a motherboard for selecting one of sub-systems immediately according to a preferred embodiment of the present invention.
Figure 2B:
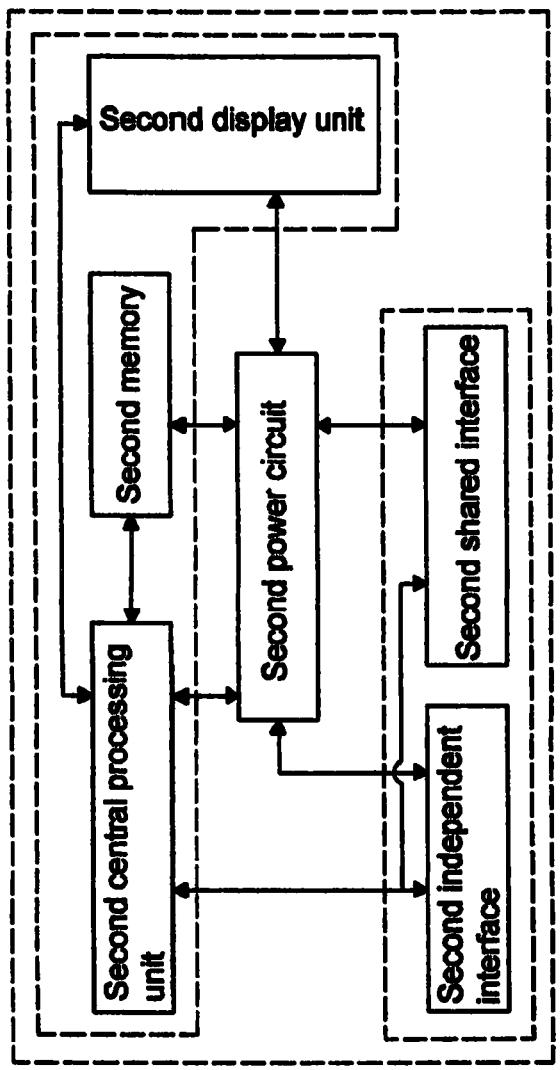
FIG. 2B is a schematic view showing a functional block diagram of a second sub-system according to a preferred embodiment of the present invention.

Referring to FIG. 2A, a block diagram of a motherboard for selecting one of sub-systems immediately according to a preferred embodiment of the present invention is illustrated. A motherboard 200 for selecting one of sub-systems immediately includes a first sub-system 202, a second sub-system 204, a shared/control unit 206, an input/output unit 208, a connector module 210, and a internet sharer 212, wherein the first sub-system 202 includes a first kernel unit 214, a first interface control unit 216, and a first power circuit 218. The first kernel unit 214 includes a first central processing unit 220, a first memory 222, and a first display unit 224. Further, the first interface control unit 216 includes a first independent interface 226 and a first shared interface 228. The first central processing unit 220 is electrically coupled to the first memory 222, the first interface control unit 216, the first power circuit 218, and the first display unit 224. The first independent interface 226 is electrically coupled to the first central processing unit 220 and the input/output unit 208. The first shared interface 228 is electrically coupled to the first central processing unit 220 and the shared/control unit 206. Referring to FIG. 2B, the functional block diagram of the second sub-system according to a preferred embodiment of the present invention is illustrated. The block diagram of the second sub-system 204 is similar to that of the first sub-system 202, and thus no further discussion will be made.

The shared/control unit 206 is electrically coupled to the first sub-system 202 and the second sub-system 204. The input/output unit 208 is electrically coupled to the shared/control unit 206, the first sub-system 202 and the second sub-system 204. The first sub-system 202 and the second sub-system 204 are electrically coupled to the internet sharer 212, such that the first sub-system 202 and the second sub-system 204 can connect to a wide area network. The internet sharer 212 is coupled to at least an external device, a personal computer for example, such that the external device can connect to a wide area network. Also, the shared/control unit 206 is coupled to the share controller 207, and the share controller 207 is electrically coupled to an external signal trigger unit 230, which generates external selecting signals. According to the external selecting signal, the shared/control unit 206 selects a corresponding sub-system to be the target sub-system. Then, the shared/control unit 206 inputs the corresponding signal of the target sub-system to the input/output unit 208. The target sub-system outputs at least a first specific signal to a corresponding peripheral, and the corresponding peripheral outputs at least a second specific signal to the target sub-system, such that the target sub-system can independently control all the shared peripherals.

Figure 3:
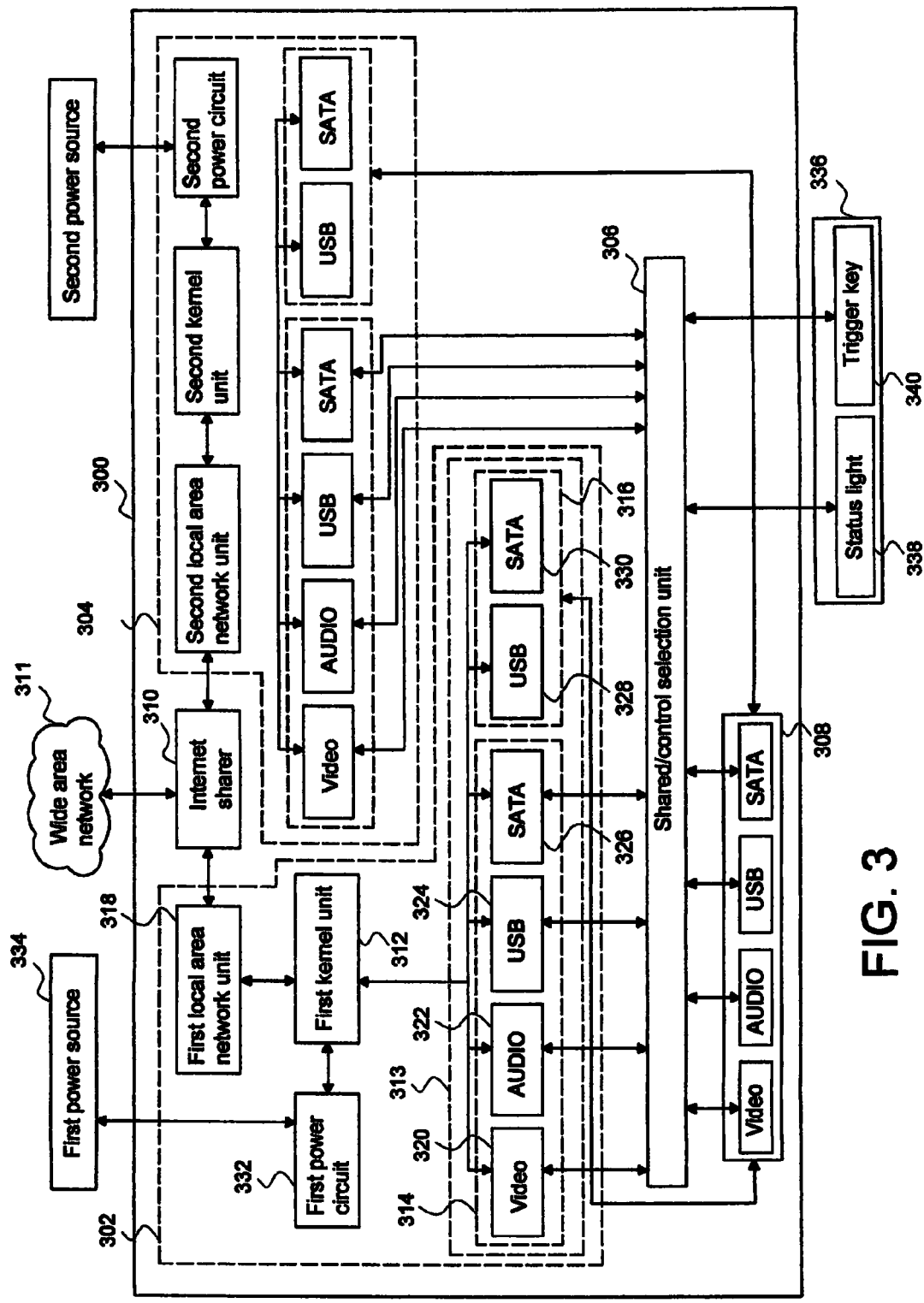
FIG. 3 is a schematic view showing a motherboard structure for selecting one of sub-systems immediately according to a preferred embodiment of the present invention.

Referring to FIG. 3, a motherboard structure for selecting one of sub-systems immediately according to a preferred embodiment of the present invention is illustrated. Referring also to FIG. 2A, a motherboard 300 for selecting one of sub-systems immediately includes a first sub-system 302, a second sub-system 304, a shared/control unit 306, an input/output unit 308, a internet sharer 310, and a first power circuit 332, wherein the first sub-system 302 includes a first kernel unit 312, a first interface control unit 313, the first power circuit 332, and a first local area network unit 318. Further, the first interface control unit 313 includes a first independent interface 316 and a first shared interface 314. The first independent interface 316 includes a USB interface 328, and a SATA interface 330. The first shared interface 314 includes a VIDEO interface 320, an AUDIO interface 322, a USB interface 324, and a SATA interface 326. In the present embodiment, the VIDEO interface 320 can use HDMI Display Port, VGA, DVI, RGB, TV-OUT or component signal.

Further, the first independent interface 316 is electrically coupled to the first kernel unit 312 and the input/output unit 308. The first shared interface 314 is electrically coupled to the first kernel unit 312 and the shared/control unit 306. The first local area network unit 318 is coupled to the first kernel unit 312 and the internet sharer 310. The internet sharer 310 is coupled to a wide area network 311, such that the first sub-system 302 and the second sub-system 304 can connect to the wide area network 311. Further, the first power circuit 332 is coupled to a first external power source 334 to provide power for the first sub-system 302. As shown in FIG. 3, the power systems of the first sub-system 302 and the second sub-system 304 are independent from each other. In the present embodiment, the structure of the second sub-system 304 is similar to that of the first sub-system 302, and thus no further discussion will be made.

A signal trigger unit 336 is disposed outside the motherboard 300 for selecting one of sub-systems immediately, and users can operate the signal trigger unit 336 to decide whether to use the first sub-system 302 or the second sub-system 304, or to use both the first sub-system 302 and the second sub-system 304 at the same time. The signal trigger unit 336 includes a status light set 338 and a trigger key 340. Users press the trigger key 340 to select the first sub-system 302 or the second sub-system 304. For example, when users select the first sub-system 302, the first sub-system 302 takes the control of the motherboard 300 for selecting one of sub-systems immediately, and the first sub-system 302 outputs a corresponding first specific signal to the input/output unit 308 for the peripherals. Also, the first sub-system 302 is input with a second specific signal from the peripherals. In the present embodiment, the above peripherals can be VIDEO interfaces, AUDIO interfaces, USB interfaces, and SATA interfaces. Consequently, when users select the first sub-system 302, the first sub-system 302 can independently control all the shared peripherals.

The first sub-system 302 and the second sub-system 304 individually have their operating systems, and the first sub-system 302 and the second sub-system 304 can be operated simultaneously. Users can immediately select the target sub-system from these two sub-systems for operation. For example, when users select the first sub-system 302, the first sub-system 302 can independently control all the shared peripherals, and the second sub-system 304 can also conduct corresponding operations at the same time. Further, the power sources of the first sub-system 302 and the second sub-system 304 can be turned off individually, and the sub-system whose power source is turned on can be used for operation. For example, first sub-system 302 is a high energy-consuming system and the second sub-system 304 is a low energy-consuming system. If users only want to operate simple tasks, they can select the second sub-system 304 and turn off the first sub-system 302 to reduce power consumption.

Figure 4:
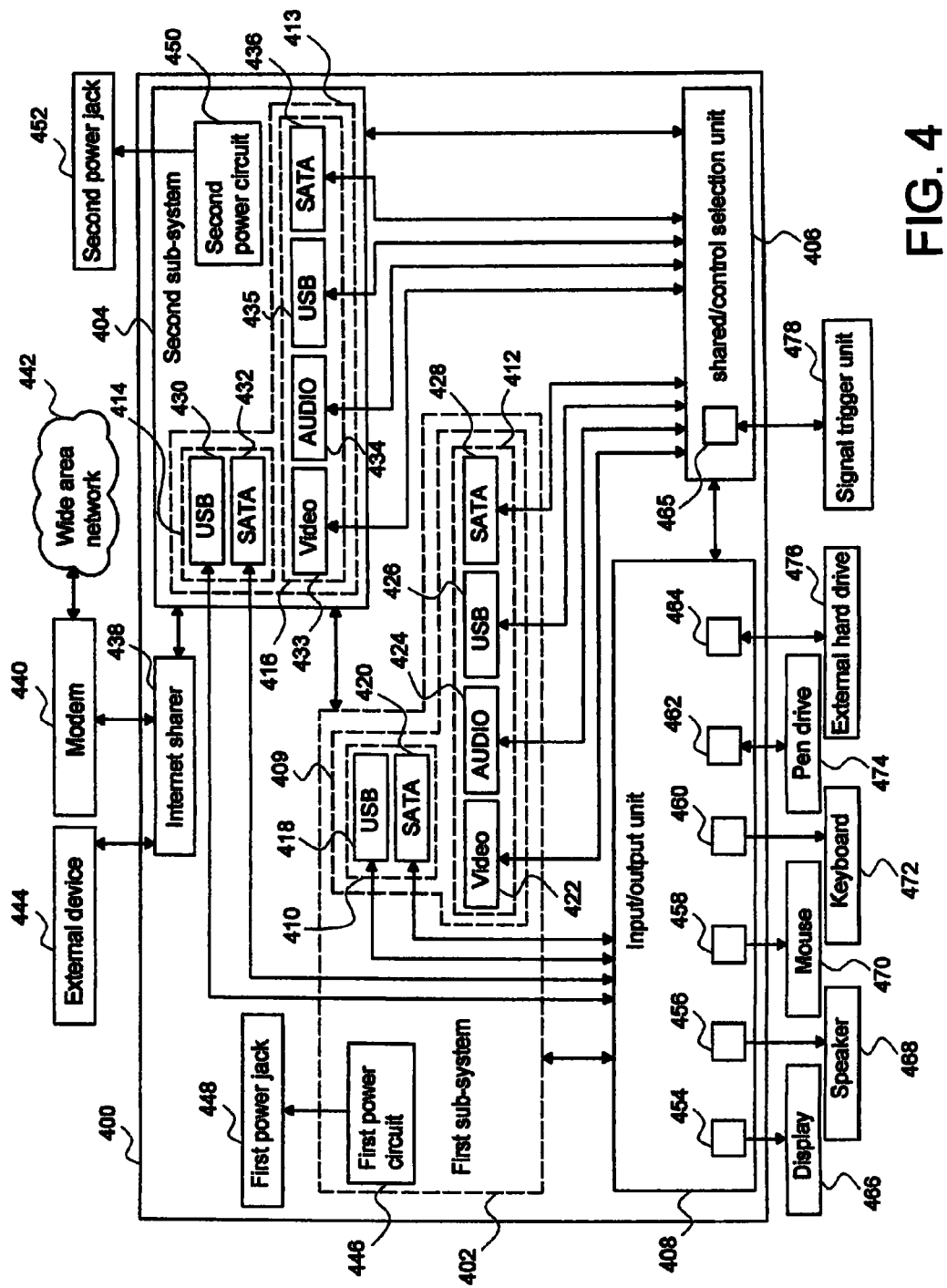
FIG. 4 is a schematic view showing a motherboard structure for selecting one of sub-systems immediately according to a preferred embodiment of the present invention.

Referring to FIG. 4, a motherboard structure for selecting one of sub-systems immediately according to a preferred embodiment of the present invention is illustrated. Referring also to FIG. 2, a motherboard 400 for selecting one of sub-systems immediately includes a first sub-system 402, a second sub-system 404, a shared/control unit 406, an input/output unit 408, an internet sharer 438, and a first power circuit 446. A first interface control unit 409 includes a first independent interface 410 and a first shared interface 412. The first independent interface 410 includes a USB interface 418 and a SATA interface 420. The first shared interface 412 includes a VIDEO interface 422, an AUDIO interface 424, a USB interface 426, and a SATA interface 428. Further, a second interface control unit 413 includes a second independent interface 414 and a second shared interface 416. The second independent interface 414 includes a USB interface 430 and a SATA interface 432. The second shared interface 416 includes a VIDEO interface 433, an AUDIO interface 434, a USB interface 435, and a SATA interface 436.

Further, the input/output unit 408 is electrically coupled to a plurality of connectors, such that the independent interface and the shared interface individually have a corresponding connector. Namely, the first independent interface 410 is electrically coupled to the input/output unit 408. The first shared interface 412 is electrically coupled to the shared/control unit 406. The second independent interface 414 is electrically coupled to the input/output unit 408. The second shared interface 416 is electrically coupled to the shared/control unit 406. The internet sharer 438 is coupled to a wide area network 442, such that the first sub-system 302 and the second sub-system 304 can connect to a wide area network 442. Also, an external device 444 can connect to the wide area network 442 via the internet sharer 438. Further, the first power circuit 446 is coupled to a first power jack 448 to provide power for the first sub-system 402. The second power circuit 450 is coupled to a second power jack 452 to provide power for the second sub-system 404.

Also, the input/output unit 408 is electrically coupled to a connector 454, a connector 456, a connector 458, a connector 460, a connector 462, and a connector 464. The shared/control unit 406 is coupled to a connector 465. Further, the connector 454 is coupled to a display 466. The connector 456 is coupled to a speaker 468. The connector 458 is coupled to a mouse 470. The connector 460 is coupled to a keyboard 472. The connector 462 is coupled to a pen drive 474. The connector 464 is coupled to an external hard drive 476. The connector 465 is coupled to a signal trigger unit 478. In the present embodiment, the first sub-system 402 is a high energy-consuming and multi-function computer with high speed data processing capacity. The second sub-system 404 is low energy-consuming computer system with simple function capacity.

For example, if users use the point-to-point data transmitting technique to download a film, they can use the second sub-system 404 to download the film and the first sub-system 402 to watch the film. Users can first select the second sub-system 404 and make the second sub-system 404 to output or input a corresponding first specific signal or a second specific signal to the display 466, the speaker 468, the mouse 470, the keyboard 472, the pen drive 474, and the external hard drive 476 (shared peripherals). In other words, when users select the second sub-system 404, the second sub-system 404 becomes the target sub-system, such that the second sub-system 404 obtains the control of all the shared peripherals and can independently control all the shared peripherals. Also, when the shared/control unit 406 selects a corresponding sub-system to be the target sub-system, other non-target sub-systems can input data into the input/output unit 408 via the independent interface. Then, the input/output unit 408 can immediately output the above data to a corresponding peripheral, the external hard drive 476 for example.

Then, after the second sub-system 404 finishes downloading data from the internet, the data will be first stored in the memory of the second sub-system 404. Then, the second sub-system 404 input the data to the input/output unit 408 via the second shared interface 416. Then the input/output unit 408 stores the data in the external hard drive 476. Then, users switch the system control right from the second sub-system 404 to the first sub-system 402 via the signal trigger unit 478. When users select the first sub-system 402, the first sub-system 402 becomes the target sub-system, such that the first sub-system 402 obtains the control of all the shared peripherals and can independently control all the shared peripherals. Then, the first sub-system 402 reads the data from the external hard drive 476 and plays the film via the first shared interface 412. Consequently, users can use the low energy-consuming sub-system to download a film and use the high energy-consuming sub-system to watch the film; two sub-systems divide the work so as to make good use of the hardware resource and effectively conserve energy consumption.

For a further example, the above external hard drive 476 can also be a non-shared peripheral and is connected to a corresponding physical connector of the second sub-system 404. Whether the second sub-system 404 is the target sub-system, the second sub-system 404 can use the second independent interface 414 to input the downloaded film into the external hard drive 476. In the mean time, when the first sub-system 402 is the target sub-system, the first sub-system 402 can integrate with the sub-system 404 via the internet sharer 438 and share the external hard drive 476 of the second sub-system 404 as an internet hard drive. In other words, while the second sub-system 404 is downloading data, the first sub-system 402 can immediately play the downloaded film or view the download progress, so as to make good use of hardware resources and effectively conserve energy consumption.

It is worth noting that the internet bandwidth in ordinary families is somewhat inadequate, and thus the time required for downloading a film in ordinary families is long; i.e., the computer has to connect to the wide area network for a long time. Consequently, computers in ordinary families are vulnerable to hackers' attacks, and yet ordinary users do not have sufficient professional knowledge to stop attacks from internet hackers; turning off computers is the best way to stop attacks from internet hackers. Referring to FIG. 4, if users only want to download data from the Internet, they can turn off the power of the first sub-system 402 and only turn on the power of the second sub-system 404 to download data from the internet. In this way, users can not only save electricity but also prevent internet hackers from attacking the first sub-system 402.

Figure 5:
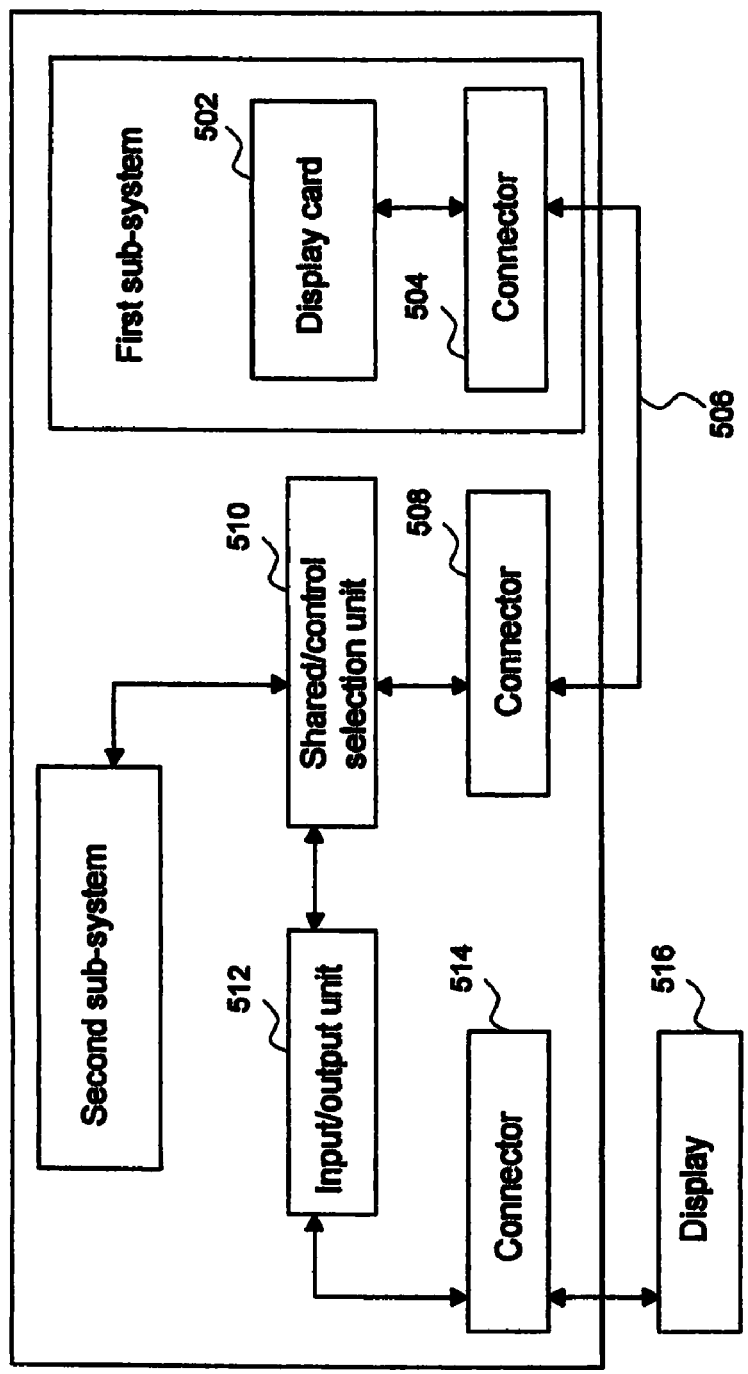
FIG. 5 is a schematic view showing the feedback signal of a display card according to a preferred embodiment of the present invention.

Referring to FIG. 5, the feedback signal of a display card according to a preferred embodiment of the present invention is illustrated. Referring also to FIG. 1A, the above sub-system can individually have a built-in display unit to display image signals. However, since the motherboard has a plurality of sub-systems, users in some cases need to use high-performance image processing techniques; some sub-systems may use built-in image signals, whereas other sub-systems may use the image signals generated by external display cards. The above sub-systems individually have at least an external card slot to connect to at least an external card; the external card feedbacks a corresponding signal to the shared/control unit. Then, via the input/output unit, the external card outputs a corresponding signal to a corresponding peripheral. For example, if the first sub-system of the motherboard uses a display card, the signals of the display card need to be feedbacked to the shared/control unit, such that the first sub-system can integratedly control all the shared peripherals. In other words, when the first sub-system becomes the target system, the motherboard can output the display card signals of the first sub-system to the display. Referring to FIG. 5, in the present embodiment, the signals generated by the display card 502 can be feedbacked to the shared/control unit 510 via the connector 504, the physical signal wire 506, and the connector 508. Then, the shared/control unit 510 outputs the signals to the input/output unit 512. Then, the input/output unit 512 outputs the signals to the display 516 via the connector 514. For example, the above physical wire 506 can be HDMI to DVI signal wire or DUAL LINK DVI signal wire.

What is claimed is:

1. A motherboard for selecting one of sub-systems, comprising:
    a plurality of sub-systems individually having a corresponding kernel unit, a corresponding interface control unit, and a corresponding power circuit;
    a shared/control unit electrically coupled to the sub-systems; and
    an input/output unit, including a shared input/output unit and a non-shared input/output unit, electrically coupled to the shared/control unit and the sub-systems;
    according to an external selecting signal, the shared/control unit selects a corresponding sub-system to be a target sub-system, and then the shared/control unit inputs a corresponding signal of the target sub-system into the input/output unit; the target sub-system outputs at least a first specific signal to a corresponding peripheral, and the corresponding peripheral outputs at least a second specific signal to the target sub-system, such that the target sub-system can independently control the corresponding shared peripheral.

2. A motherboard for selecting one of sub-systems as claimed in claim 1 wherein the kernel unit comprises:
    a memory; and
    a central processing unit electrically coupled to the memory, the interface control unit, and the power circuit.

3. A motherboard for selecting one of sub-systems as claimed in claim 1 wherein the interface control unit comprises:
    at least an independent interface electrically coupled to the input/output unit; and
    at least a shared interface electrically coupled to the shared/control unit.

4. A motherboard for selecting one of sub-systems as claimed in claim 3 wherein the independent interface comprises a USB interface or a SATA interface.

5. A motherboard for selecting one of sub-systems as claimed in claim 3 wherein the shared interface comprises a VIDEO interface, an AUDIO interface, a USB interface, or a SATA interface.

6. A motherboard for selecting one of sub-systems as claimed in claim 1 wherein the motherboard further comprises a shared internet connection and the sub-systems are electrically coupled to the shared internet connection.

7. A motherboard for selecting one of sub-systems as claimed in claim 6 wherein the shared internet connection is coupled to at least an external device such that the external device can connect to a wide area network.

8. A motherboard for selecting one of sub-systems as claimed in claim 1 wherein sub-systems individually have an independent operating system, such that the sub-systems can operate simultaneously, and users can select a sub-system from the sub-systems to be the target sub-system for operation.

9. A motherboard for selecting one of sub-systems as claimed in claim 1 wherein corresponding power sources of the sub-systems can be turned off individually and only a power source of the target sub-system is turned on for operation.

10. A motherboard for selecting one of sub-systems as claimed in claim 1 wherein the input/output unit is electrically coupled to a plurality of connectors, such that each independent interface has a corresponding connector and each shared interface has a corresponding connector.

11. A motherboard for selecting one of sub-systems as claimed in claim 1 wherein the motherboard further comprises a share controller, which is electrically coupled to the shared/control unit and which is electrically connected to an external signal trigger unit via a connector, so as to generate the external selecting signal.

12. A motherboard for selecting one of sub-systems as claimed in claim 11 wherein the external signal trigger unit has a plurality of status lights to indicate the corresponding target sub-systems.

13. A motherboard for selecting one of sub-systems as claimed in claim 1 wherein the sub-systems individually have a built-in display unit to output image signals.

14. A motherboard for selecting one of sub-systems as claimed in claim 1 wherein the sub-systems individually have at least an external card slot to connect to an external card, the external card feeds back a corresponding signal to the shared/control unit, and then the corresponding signal of the external card is output to a corresponding peripheral via the input/output unit.

15. A motherboard for selecting one of sub-systems as claimed in claim 14 wherein a connector of the external card is coupled to a corresponding connector of the motherboard via a physical signal wire, such that the external card feeds back a corresponding signal to the shared/control unit.

16. A motherboard for selecting one of sub-systems as claimed in claim 14 wherein the external card is a display card.

17. A motherboard for selecting one of sub-systems as claimed in claim 1 wherein an external device is coupled to the shared/control unit via an external feedback device.

18. A motherboard for selecting one of sub-systems as claimed in claim 17 wherein the shared/control unit selects the external device to be the target sub-system via the external selecting signal.

19. A motherboard for selecting one of sub-systems as claimed in claim 1 wherein when the shared/control unit selects a corresponding sub-system to be the target sub-system, other sub-systems can output data to the input/output unit via a corresponding independent interface, and then the input/output unit can output the data to a corresponding peripheral.

20. A motherboard for selecting one of sub-systems as claimed in claim 1 wherein the shared input/output unit and the non-shared input/output unit have individually at least a corresponding physical connector, and the corresponding peripherals are connected to the corresponding physical connectors so as to determine if the corresponding peripheral is shared.

21. A motherboard for selecting one of sub-systems as claimed in claim 1 wherein the motherboard further comprises a share controller which comprises:
   a demultiplexer having an output terminal coupled to the shared/control unit;
   a buffer coupled to an input terminal of the demultiplexer; and
   an AND gate having an output terminal coupled to the buffer and of which input terminal is coupled to a signal trigger unit and the shared/control unit;
   when the signal trigger unit generates a first trigger signal, an operating system removes a corresponding sub-system and then generates a second trigger signal, and the shared/control unit inputs the second trigger signal to the input terminal of the AND gate to switch the target sub-system according to the first trigger signal and the second trigger signal.

* * * * *